United States Patent
Karpfinger et al.

(10) Patent No.: US 9,581,716 B2
(45) Date of Patent: Feb. 28, 2017

(54) METHODS AND APPARATUS FOR ESTIMATING BOREHOLE MUD SLOWNESSES

(71) Applicant: Schlumberger Technology Corporation, Sugar Land, TX (US)

(72) Inventors: Florian Karpfinger, Cambridge, MA (US); John Walsh, Houston, TX (US); Romain Prioul, Somerville, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 386 days.

(21) Appl. No.: 13/746,284

(22) Filed: Jan. 21, 2013

(65) Prior Publication Data
US 2014/0204710 A1 Jul. 24, 2014

(51) Int. Cl.
*G01V 1/06* (2006.01)
*E21B 47/00* (2012.01)
*G01V 1/50* (2006.01)
*E21B 47/18* (2012.01)

(52) U.S. Cl.
CPC .............. *G01V 1/50* (2013.01); *E21B 47/18* (2013.01); *G01V 2210/6222* (2013.01)

(58) Field of Classification Search
USPC .......................................................... 367/31
See application file for complete search history.

(56) References Cited

U.S. PATENT DOCUMENTS

| | | | |
|---|---|---|---|
| 4,964,101 A | 10/1990 | Liu et al. | |
| 6,308,137 B1 | 10/2001 | Underhill et al. | |
| 6,714,480 B2 | 3/2004 | Sinha et al. | |
| 7,457,194 B2* | 11/2008 | Prioul et al. | ..................... 367/25 |
| 7,463,550 B2* | 12/2008 | Sinha et al. | ..................... 367/25 |
| 7,529,152 B2* | 5/2009 | Sinha et al. | ..................... 367/31 |
| 2003/0167835 A1 | 9/2003 | Sinha et al. | |
| 2004/0001389 A1* | 1/2004 | Tang | ......................... G01V 1/50 367/31 |
| 2006/0016592 A1* | 1/2006 | Wu | ......................... 166/250.07 |
| 2006/0256655 A1* | 11/2006 | Sinha et al. | ..................... 367/31 |
| 2006/0256656 A1* | 11/2006 | Sinha et al. | ..................... 367/31 |
| 2007/0268782 A1 | 11/2007 | Pabon et al. | |
| 2008/0062814 A1* | 3/2008 | Prioul et al. | ..................... 367/31 |
| 2009/0210160 A1 | 8/2009 | Suarez-Rivera et al. | |
| 2009/0225627 A1* | 9/2009 | Sinha et al. | ..................... 367/31 |
| 2009/0257307 A1 | 10/2009 | Valero et al. | |
| 2012/0078600 A1 | 3/2012 | Horne et al. | |

(Continued)

OTHER PUBLICATIONS

Karpfinger, et al, "Theoretical estimate of the tube-wave modulus in arbitrarily anisotropic media: Comparisons between semianalytical, FEM, and approximate solutions," Society of Exploration Geophysicists, Sep.-Oct. 2012, vol. 77, No. 5, pp. D199-D208.

(Continued)

*Primary Examiner* — James Hulka
(74) *Attorney, Agent, or Firm* — Michael Dae

(57) ABSTRACT

Methods and apparatus for estimating borehole mud slownesses are disclosed. An example method includes estimating a borehole drilling fluid slowness value based on a tube wave modulus value, a tube-wave slowness value, and a drilling fluid density value. The borehole is associated with an anisotropic elastic medium.

15 Claims, 6 Drawing Sheets

(56) References Cited

U.S. PATENT DOCUMENTS

2013/0322210 A1* 12/2013 Alford et al. .................. 367/31

OTHER PUBLICATIONS

International search report for the equivalent PCT patent application No. PCT/IB2014/058403 issued on Apr. 29, 2014.
Harrison et al., "Acquisition and Analysis of Sonic Waveforms From a Borehole Monopole and Dipole Source for the Determination of Compressional and Shear Speeds and Their Relation to Rock Mechanical Properties and Surface Seismic Data", Society of Petroleum Engineers, SPE 20557, 1990.
Valero, et al, "Estimation of borehole fluid slowness using sonic array waveforms," SEG Expanded Abstracts, 28.1.
Hornby, Howlie, Ince, 2003, Anisotropy Correction deviated-well sonic logs: Application to seismic well tie, Geophysics 68, 2, 464-471.
Amadei, "Rock anisotropy and the theory of stress measurements", 1983.
R. Burridge, S. Kostek, A. Kurkjian 1993, "Tube waves seismic waves and effective sources," Wave Motion, 18, 163-210.
Karpfinger, Home, Prioul, Tube-wave modulus in anisotropic media: comparison between White-Lekhnitskil-Amadei and Burridge approaches, 2011.
White, J.E. 1983, Underground sound application of seismic waves; Elsevier.
F. Karpfinger, et al, "Theoretical estimate of the tube-wave modulus in arbitrarily anisotropic media: Comparisons between semi-analytical, FEM, and approximate solutions," Geophysics, vol. 77, No. 5, pp. 1-10.
M. Schoenberg, et al, "Introducing Annie: A Simple Three-Parameter Anisotropic Velocity Model for Shales," Journal of Seismic Exploration 5, pp. 35-49, 1996.

* cited by examiner

METHODS AND APPARATUS FOR ESTIMATING BOREHOLE MUD SLOWNESSES

BACKGROUND

Sonic data may be obtained using a wireline tool and/or while drilling. This sonic data may be used to evaluate the formation, for example.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter An example method includes estimating a borehole drilling fluid slowness value based on a tube wave modulus value, a tube-wave slowness value, and a drilling fluid density value. The borehole is associated with an anisotropic elastic medium.

An example method includes processing borehole sonic waveform data to determine a drilling fluid slowness estimate. The drilling fluid slowness estimate is based on a tube-wave modulus value, a tube-wave slowness value, and a drilling fluid density value. The borehole is associated with an anisotropic elastic medium. The tube-wave modulus value is associated with radial displacement along a contour of a borehole.

An example apparatus includes sources spaced from a receiver. The sources are to transmit signals and the receiver is to receive at least a portion of the signals. The apparatus includes a processor to process borehole sonic waveform data to determine a drilling fluid slowness estimate. The drilling fluid slowness estimate is based on a tube-wave modulus value, a tube-wave slowness value, and a drilling fluid density value.

BRIEF DESCRIPTION OF THE DRAWINGS

Embodiments of methods and apparatus for estimating borehole mud slownesses are described with reference to the following figures. The same numbers are used throughout the figures to reference like features and components.

DETAILED DESCRIPTION

Figure 1:
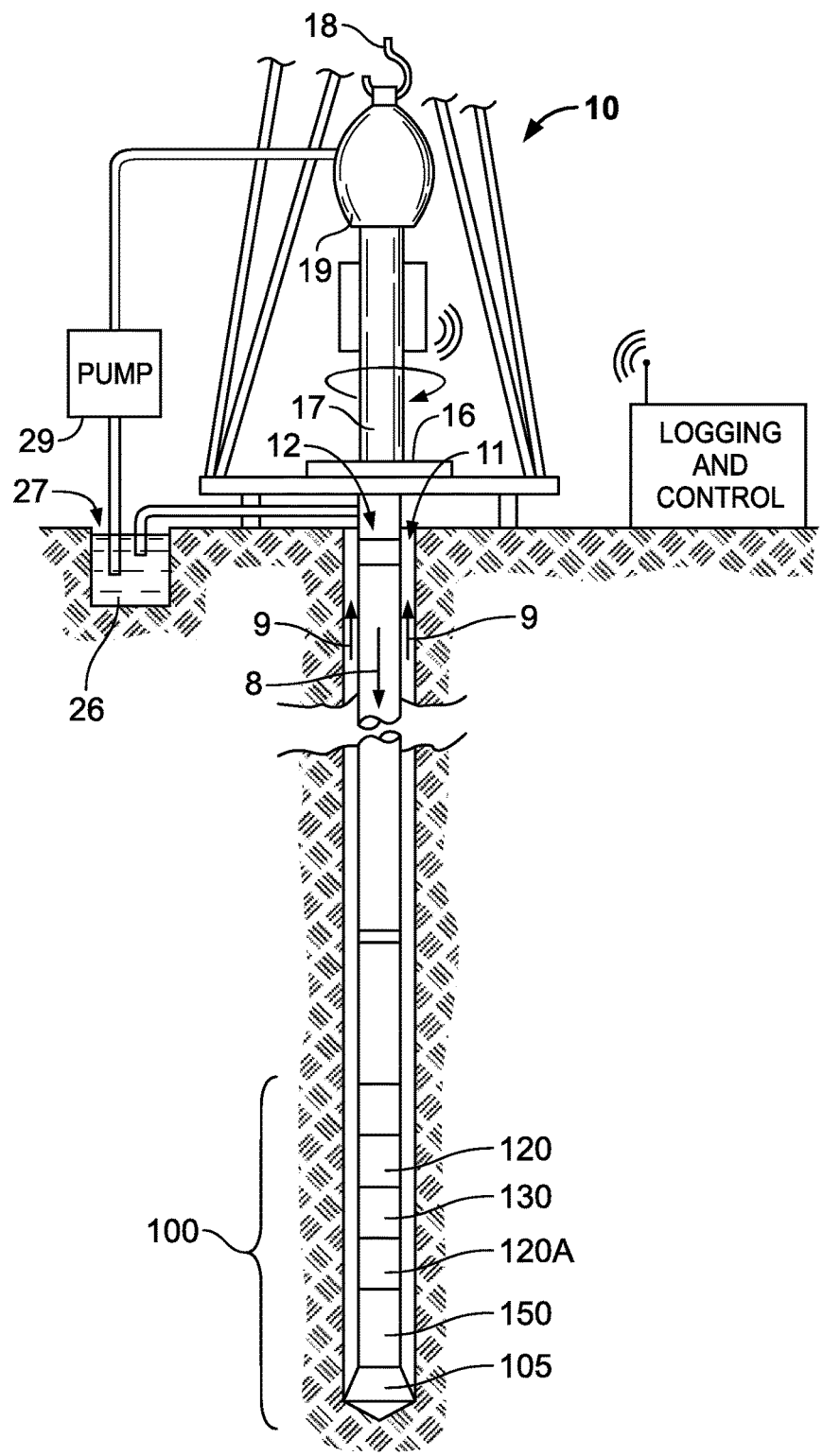
FIG. 1 illustrates an example system in which embodiments of the methods and apparatus for estimating borehole mud slownesses may be implemented.

In the following detailed description of the embodiments, reference is made to the accompanying drawings, which form a part hereof, and within which are shown by way of illustration specific embodiments by which the examples described herein may be practiced. It is to be understood that other embodiments may be utilized and structural changes may be made without departing from the scope of the disclosure.

The examples disclosed herein relate to borehole sonic acquisition and/or analysis for petrophysics and/or borehole geophysics to enable accurate and/or reliable mud slowness estimates in isotropic and/or anisotropic elastic rock formations. Such mud slowness estimates may be used to identify natural gas entry points and/or to interpret and/or evaluate borehole sonic data obtained from boreholes having different orientations and/or material elastic anisotropies.

In practice, mud slowness may not be directly measured downhole. To obtain estimates of the mud slowness downhole, the mud slowness may be measured at the surface and/or estimated indirectly from existing sonic logging measurements (sonic data) obtained using a multimode sonic tool. The sonic logging measurements may include monopole P- and S-waves, dipole flexural waves and/or monopole Stoneley waves, for example. While surface measurements enable a direct measurement of the mud slowness, measuring the mud slowness at the surface does not represent real well conditions.

In some examples, the mud slowness may be determined by obtaining and processing sonic log data. The sonic logs may be obtained while drilling (FIG. 1) and/or via wireline (FIG. 2.) using a multimode sonic tool. Monopole data, dipole data, quadrupole data, pseudo-Rayleigh data, and Stoneley data may be obtained from the sonic logs. A three-dimensional (3D) deviation survey may be obtained from inclinometry tools on the wireline or LWD logging string. In some examples, low frequency monopole Stoneley measurements may be used to determine a Tube-wave slowness, $s_{Tube}$.

In practice, monopole and dipole flexural sonic modes may be processed to determine compressional and shear slownesses (e.g., one compressional and two shear slownesses). In some examples, from a combination of the determined slownesses, a rock physics model and/or data from another borehole, five elastic constants, $C_{11}$, $C_{33}$, $C_{55}$, $C_{66}$ and $C_{13}$, may be estimated. The five elastic constants can be used to generate an elastic stiffness tensor, $c^{(VTI)}$, represented by Equation 1, where $C_{12}=C_{11}-2C_{66}$. By inverting the elastic stiffness tensor, $c^{(VTI)}$, an elastic compliance tensor, $a^{(VTI)}$ may be generated, as represented in Equation 2.

$$c^{(VTI)} = \begin{bmatrix} c_{11} & c_{12} & c_{13} & 0 & 0 & 0 \\ c_{12} & c_{11} & c_{13} & 0 & 0 & 0 \\ c_{13} & c_{13} & c_{33} & 0 & 0 & 0 \\ 0 & 0 & 0 & c_{55} & 0 & 0 \\ 0 & 0 & 0 & 0 & c_{55} & 0 \\ 0 & 0 & 0 & 0 & 0 & c_{66} \end{bmatrix} \quad \text{Equation 1}$$

$$a^{(VTI)} = \begin{bmatrix} a_{11} & a_{12} & a_{13} & 0 & 0 & 0 \\ a_{12} & a_{11} & a_{13} & 0 & 0 & 0 \\ a_{13} & a_{13} & a_{33} & 0 & 0 & 0 \\ 0 & 0 & 0 & a_{55} & 0 & 0 \\ 0 & 0 & 0 & 0 & a_{55} & 0 \\ 0 & 0 & 0 & 0 & 0 & a_{66} \end{bmatrix} \quad \text{Equation 2}$$

As represented in Equation 3, a reduced strain coefficient, $\beta_{ij}$, may be determined using the elastic compliance tensor, $\alpha^{(VTI)}$ where i, j=1, ..., 6.

$$\beta_{ij} = a_{ij} - \frac{a_{i3} a_{j3}}{a_{33}} \qquad \text{Equation 3}$$

With regards to isotropic media, additional relationships may be represented as $C_{11}=C_{33}$, $C_{55}=C_{66}$ and $C_{13}=C_{12}$.

In some examples, a tube-wave modulus, may be determined using a Lekhnitskii-Amadei-White (LAW) solution, as represented in Equation 4, where A corresponds to the undeformed cross-sectional area of a borehole before a pressure pulse, p, and $\Delta A$ corresponds to the relative change in the borehole cross-sectional area caused by the pressure pulse, p. In some examples, the $\Delta A$ depends on the radial displacement, $u_r(\theta)$, along the borehole wall contour. The $\Delta A$ changes as a function of the azimuth and can be determined using Equation 5 and $\theta$ is the azimuth angle around the circumference of the borehole wall.

$$\mu^* = \frac{A}{\Delta A} p \qquad \text{Equation 4}$$

$$\Delta A = \int_0^{2\pi}\int_0^{R(\theta)+u_r(\theta)} r \, dr \, d\theta - A \qquad \text{Equation 5}$$
$$= \int_0^{2\pi}\int_{R(\theta)}^{R(\theta)+u_r(\theta)} r \, dr \, d\theta$$

The displacement components, $u_r(\theta)$, along a contour of a borehole in an anisotropic material may be determined using Equations 6-25. Equation 6 represents a characteristic equation that may be used to determine the different values $\mu_1$, $\mu_2$ and $\mu_3$ used to determine the coefficients $\lambda_1$, $\lambda_2$ and $\lambda_3$, defined by Equations 7-10, where $l_2(\mu)$, $l_3(\mu)$ and $l_4(\mu)$ are defined by Equations 11-13.

$$l_4(\mu)l_2(\mu) - l_3(\mu)^2 = 0 \qquad \text{Equation 6}$$

$$\lambda_1 = -\frac{l_3(\mu_1)}{l_2(\mu_1)} \qquad \text{Equation 7}$$

$$\lambda_2 = -\frac{l_3(\mu_2)}{l_2(\mu_2)} \qquad \text{Equation 8}$$

$$\lambda_3 = -\frac{l_3(\mu_3)}{l_4(\mu_3)} \qquad \text{Equation 9}$$

$$l_2(\mu) = \beta_{44} - 2\beta_{45}\mu + \beta_{55}\mu^2 \qquad \text{Equation 10}$$

$$l_3(\mu) = -\beta_{24} + (\beta_{25}+\beta_{46})\mu - (\beta_{14}+\beta_{56})\mu^2 + \beta_{15}\mu^3 \qquad \text{Equation 11}$$

$$l_4(\mu) = \beta_{22} - 2\beta_{26}\mu + (2\beta_{12}+\beta_{66})\mu^2 - 2\beta_{16}\mu^3 + \beta_{11}\mu^4 \qquad \text{Equation 12}$$

Equations 13-18 may be used to determine the coefficients $p_k$, $q_k$ and $r_k$.

$$p_k = \beta_{11}\mu_k^2 + \beta_{12} - \beta_{16}\mu_k + \lambda_k(\beta_{15}\mu_k - \beta_{14}) \qquad \text{Equation 13}$$
for k = 1, 2

$$q_k = \beta_{12}\mu_k + \frac{\beta_{22}}{\mu_k} - \beta_{26} + \lambda_k\left(\beta_{25}\mu_k - \frac{\beta_{24}}{\mu_k}\right) \qquad \text{Equation 14}$$
for k = 1, 2

$$r_k = \beta_{14}\mu_k + \frac{\beta_{24}}{\mu_k} - \beta_{46} + \lambda_k\left(\beta_{45}\mu_k - \frac{\beta_{44}}{\mu_k}\right) \qquad \text{Equation 15}$$
for k = 1, 2

$$p_3 = \lambda_3(\beta_{11}\mu_3^2 + \beta_{12} - \beta_{16}\mu_3) + \beta_{15}\mu_3 - \beta_{14} \qquad \text{Equation 16}$$

$$q_3 = \lambda_3\left(\beta_{12}\mu_3 + \frac{\beta_{22}}{\mu_3} - \beta_{26}\right) + \beta_{25} - \frac{\beta_{24}}{\mu_3} \qquad \text{Equation 17}$$

$$r_3 = \lambda_3\left(\beta_{14}\mu_3 + \frac{\beta_{24}}{\mu_3} - \beta_{46}\right) + \beta_{45} - \frac{\beta_{44}}{\mu_3} \qquad \text{Equation 18}$$

Equations 19-21 are complex analytical functions, where the complex variable $z_k = x + \mu_k y$, $\Delta$ is defined as $\Delta = \mu_2 - \mu_1 + \lambda_3\lambda_2(\mu_1-\mu_3) + \lambda_1\lambda_3(\mu_3-\mu_2)$ and x and y are the coordinates of a point where stress and displacement are determined.

$$\phi_1(z_1) = \frac{1}{2\Delta\xi_1}((\mu_2 - \mu_3\lambda_2\lambda_3)(p_w - \sigma_{yy,0} + i\tau_{xy,0}) + (\lambda_2\lambda_3 - 1) \qquad \text{Equation 19}$$
$$(ip_w + \tau_{xy,0} - i\sigma_{xx,0}) + \lambda_3(\mu_3 - \mu_2)(\tau_{yz,0} - i\tau_{xz,0}))$$

$$\phi_2(z_2) = \frac{1}{2\Delta\xi_2}((\mu_3\lambda_1\lambda_3 - \mu_1)(p_w - \sigma_{yy,0} + i\tau_{xy,0}) + (1 - \lambda_1\lambda_3) \qquad \text{Equation 20}$$
$$(ip_w + \tau_{xy,0} - i\sigma_{xx,0}) + \lambda_3(\mu_1 - \mu_3)(\tau_{yz,0} - i\tau_{xz,0}))$$

$$\phi_3(z_3) = \frac{1}{2\Delta\xi_3}((\mu_1\lambda_2 - \mu_2\lambda_1)(p_w - \sigma_{yy,0} + i\tau_{xy,0}) + (\lambda_1 - \lambda_2) \qquad \text{Equation 21}$$
$$(ip_w + \tau_{xy,0} - i\sigma_{xx,0}) + (\mu_2 - \mu_1)(\tau_{yz,0} - i\tau_{xz,0}))$$

with $\xi_k = \dfrac{z_k + \sqrt{\left(\dfrac{z_k}{a}\right)^2 - 1 - \mu_k^2}}{1 - i\mu_k}$ for k = 1, 2 and 3

In some examples, the stress tensor components $\sigma_{yy,0}$, $\sigma_{xx,0}$, $\tau_{xy,0}$, $\tau_{yz,0}$ and $\tau_{xz,0}$ are set to zero and $p_w$ is set to the pressure pulse, p, which may be selected.

Equations 22-24 may be used to determine the displacements for a given reduced strain coefficient, $\beta_{ij}$, pressure pulse, p, initial displacements, $u_0$, $v_0$ and $w_0$ and the coordinates x and y.

$$u(x,y) = u_0 - 2Re(\Sigma_{k=1}^3 p_k\phi_k(z_k)) \qquad \text{Equation 22}$$

$$v(x,y) = v_0 - 2Re(\Sigma_{k=1}^3 q_k\phi_k(z_k)) \qquad \text{Equation 23}$$

$$w(x,y) = w_0 - 2Re(\Sigma_{k=1}^3 r_k\phi_k(z_k)) \qquad \text{Equation 24}$$

Equation 25 may be used to determine the radial displacement, $u_r(\theta)$.

$$u_r(\theta) = u(x,y)\cos\theta + v(x,y)\sin\theta \qquad \text{Equation 25}$$

In some examples, the mud density, $\rho_{Mud}$, may be estimated from the mud weight and/or measured at discrete depth points using a downhole formation tester tool such as the Modular Dynamics Tool (MDT).

At a zero frequency limit, the mud slowness, $s_{Mud}$, is related to the tube-wave slowness, $s_{Tube}$. Equation 26 may be used to determine the mud slowness, $s_{mud}$, using the determined tube-wave slowness, $s_{Tube}$, the tube-wave modulus, $\mu^*$, and the mud density, $\rho_{Mud}$.

$$s_{Mud} = \sqrt{s_{tube}^2 - \frac{\rho_{Mud}}{\mu^*}} \qquad \text{Equation 26}$$

FIG. 1 illustrates a wellsite system in which the examples disclosed herein can be employed. The wellsite can be onshore or offshore. In this example system, a borehole 11 is formed in subsurface formations by rotary drilling. However, the examples described herein can also use directional drilling, as will be described hereinafter.

A drill string 12 is suspended within the borehole 11 and has a bottom hole assembly 100 that includes a drill bit 105 at its lower end. The surface system includes a platform and derrick assembly 10 positioned over the borehole 11. The assembly 10 includes a rotary table 16, a kelly 17, a hook 18 and a rotary swivel 19. The drill string 12 is rotated by the rotary table 16. The rotatory table 16 may be energized by a device or system not shown. The rotary table 16 may engage the kelly 17 at the upper end of the drill string 12. The drill string 12 is suspended from the hook 18, which is attached to a traveling block (also not shown). Additionally, the drill string 12 is positioned through the kelly 17 and the rotary swivel 19, which permits rotation of the drill string 12 relative to the hook 18. Additionally or alternatively, a top drive system may be used to impart rotation to the drill string 12.

In this example, the surface system further includes drilling fluid or mud 26 stored in a pit 27 formed at the well site. A pump 29 delivers the drilling fluid 26 to the interior of the drill string 12 via a port in the swivel 19, causing the drilling fluid 26 to flow downwardly through the drill string 12 as indicated by the directional arrow 8. The drilling fluid 26 exits the drill string 12 via ports in the drill bit 105, and then circulates upwardly through the annulus region between the outside of the drill string 12 and the wall of the borehole 11, as indicated by the directional arrows 9. In this manner, the drilling fluid 26 lubricates the drill bit 105 and carries formation cuttings up to the surface as it is returned to the pit 27 for recirculation.

The bottom hole assembly 100 of the example illustrated in FIG. 1 includes a logging-while-drilling (LWD) module 120, a measuring-while-drilling (MWD) module 130, a roto-steerable system and motor 150, and the drill bit 105.

The LWD module 120 may be housed in a special type of drill collar and can contain one or more logging tools. In some examples, the bottom hole assembly 100 may include additional LWD and/or MWD modules. As such, references throughout this description to reference numeral 120 may additionally or alternatively include 120A. The LWD module 120 may include capabilities for measuring, processing, and storing information, as well as for communicating with the surface equipment. Additionally or alternatively, the LWD module 120 includes a sonic measuring device.

The MWD module 130 may also be housed in a drill collar and can contain one or more devices for measuring characteristics of the drill string 12 and/or drill bit 105. The MWD module 130 further may include an apparatus (not shown) for generating electrical power for at least portions of the bottom hole assembly 100. The apparatus for generating electrical power may include a mud turbine generator powered by the flow of the drilling fluid. However, other power and/or battery systems may be employed. In this example, the MWD module 130 includes one or more of the following types of measuring devices: a weight-on-bit measuring device, a torque measuring device, a vibration measuring device, a shock measuring device, a stick slip measuring device, a direction measuring device and/or an inclination measuring device.

Although the components of FIG. 1 are shown and described as being implemented in a particular conveyance type, the examples disclosed herein are not limited to a particular conveyance type but, instead, may be implemented in connection with different conveyance types including, for example, coiled tubing, wireline wired drill-pipe and/or any other conveyance types known in the industry.

Figure 2:
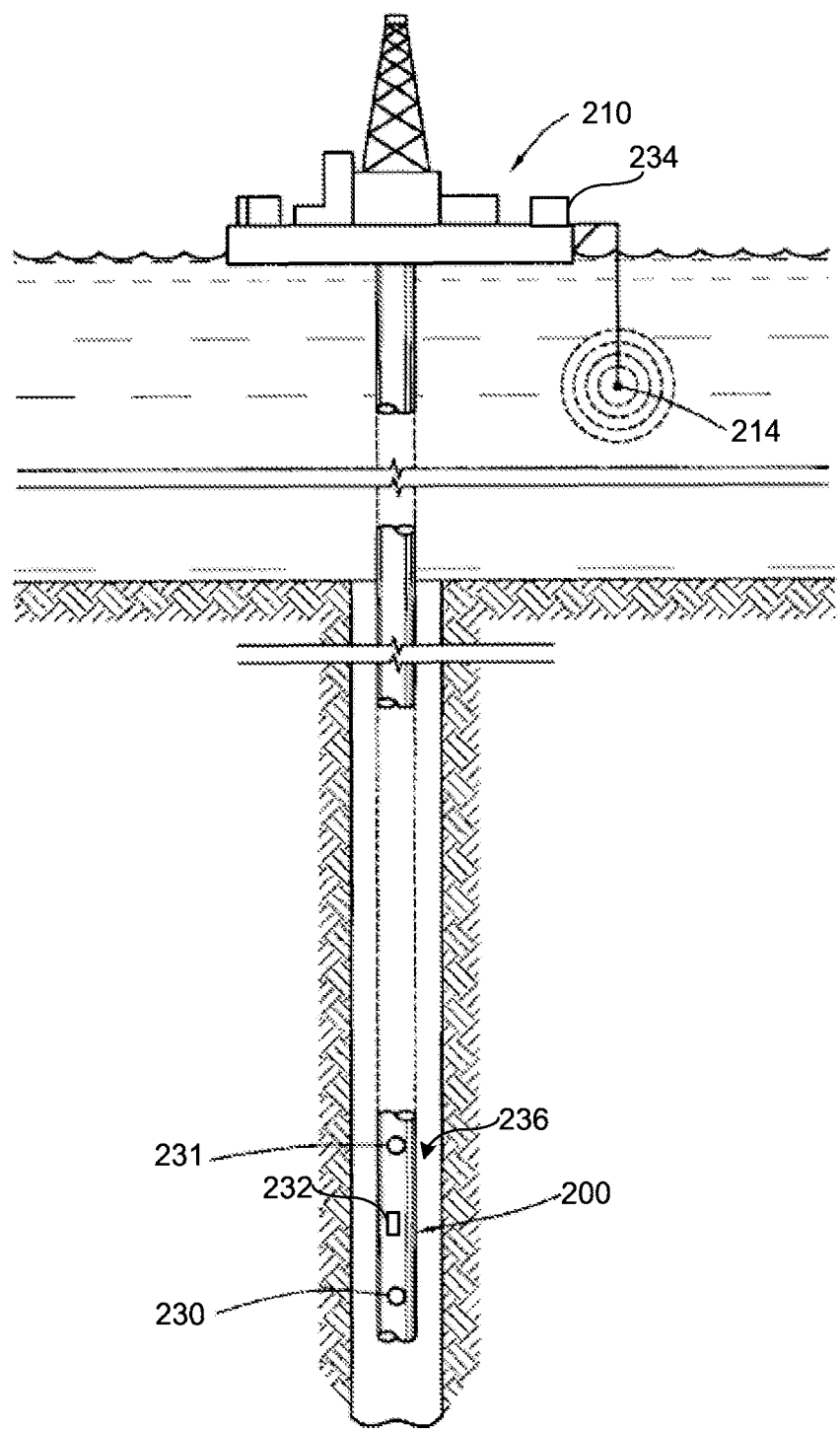
FIG. 2 illustrates another example system in which embodiments of the methods and apparatus for estimating borehole mud may be implemented.

FIG. 2 illustrates a sonic logging-while-drilling tool that can be used to implement the LWD tool 120 or may be a part of an LWD tool suite 120A of the type described in U.S. Pat. No. 6,308,137, which is hereby incorporated herein by reference in its entirety. An offshore rig 210 having a sonic transmitting source or array 214 may be deployed near the surface of the water. Additionally or alternatively, any other type of uphole or downhole source or transmitter may be provided to transmit sonic signals. In some examples, an uphole processor controls the firing of the transmitter 214.

Uphole equipment can also include acoustic receivers (not shown) and a recorder (not shown) for capturing reference signals near the source of the signals (e.g., the transmitter 214). The uphole equipment may also include telemetry equipment (not shown) for receiving MWD signals from the downhole equipment. The telemetry equipment and the recorder are may be coupled to a processor (not shown) so that recordings may be synchronized using uphole and downhole clocks. A downhole LWD module 200 includes at least acoustic receivers 230 and 231, which are coupled to a signal processor so that recordings may be made of signals detected by the receivers in synchronization with the firing of the signal source.

In operation, the transmitter 214 transmits signals and/or waves that are received by one or more of the receivers 230, 231. The received signals may be recorded and/or logged to generate associated waveform data. The waveform data may be processed by processors 232 and/or 234 to determine mud slowness values as disclosed herein.

Figure 3:
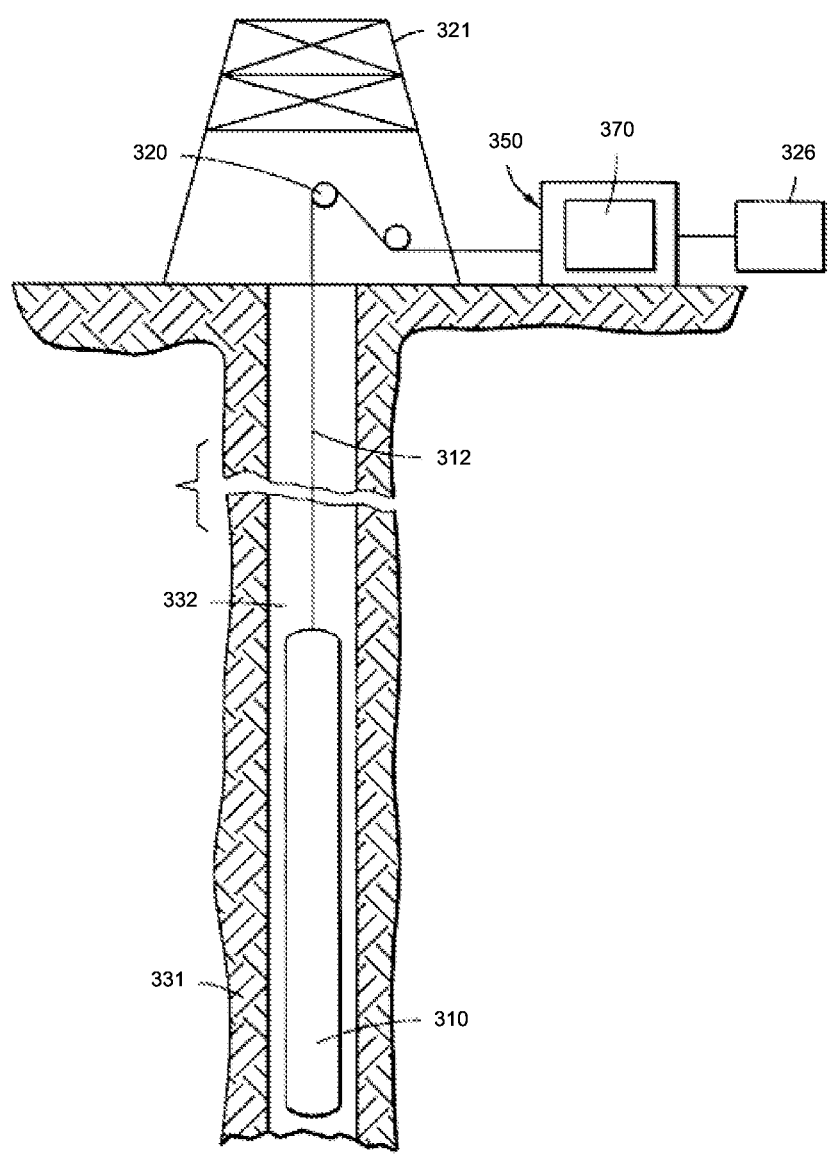
FIGS. 3 and 4 illustrate an example system in which embodiments of the methods and apparatus for estimating borehole mud may be implemented.

FIG. 3 depicts an example an apparatus which can be used in implement the examples disclosed herein. In some examples, subsurface formations 331 are traversed by a borehole 332. The borehole 332 may be filled with drilling fluid and/or mud. In the illustrated example, a logging tool 310 is suspended on an armored cable 312 and may have optional centralizers. The cable 312 extends up the borehole 332, over a sheave wheel 320 on a derrick 321 to a winch forming part of surface equipment 350. A depth gauging apparatus may be provided to measure cable displacement over the sheave wheel 320 and the depth of the logging tool 310 in the borehole 332.

In some examples, a device is included in the tool 310 to produce a signal indicative of an orientation of the body of the tool 310. Processing and interface circuitry within the tool 310 amplifies, samples and/or digitizes the tool's information signals for transmission and communicates the signals to the surface equipment 350 via, for example, the cable 312. Electrical power and control signals for coordinating operation of the tool 310 are generated by the surface equipment 350 and communicated via the cable 312 to circuitry provided within the tool 310. The surface equipment includes a processor 370, peripheral equipment and/or a recorder 326.

Figure 4:
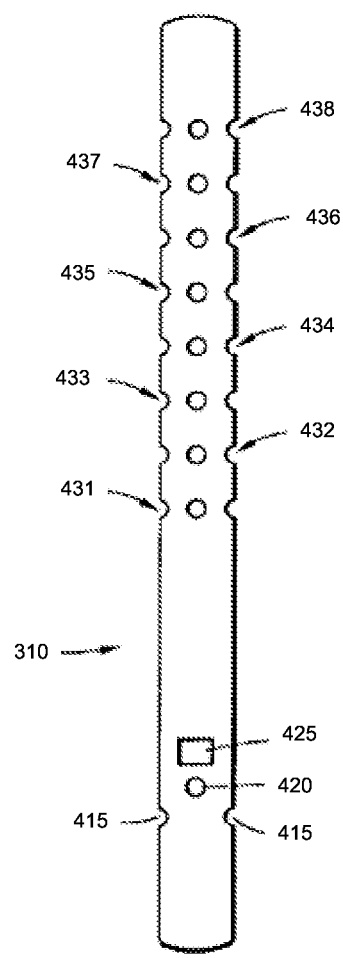

The logging device 310 may be, for example, a Dipole Shear Sonic Imager ("DSI"—trademark of Schlumberger®) of the type described in Harrison et al., "Acquisition and Analysis of Sonic Waveforms From a Borehole Monopole and Dipole Source for the Determination of Compressional and Shear Speeds and Their Relation to Rock Mechanical Properties and Surface Seismic Data", Society of Petroleum Engineers, SPE 20557, 1990. Portions of the logging device are shown in greater detail in FIG. 4. In some examples, the logging device 310 includes crossed dipole transmitters 415 and 420 and a monopole transmitter 425. In the illustrated example, eight spaced apart receiver stations, designated 431 through 438 each include four receiver hydrophones mounted azimuthally at ninety degree intervals in the surface of the cylindrical logging device.

Figure 5:
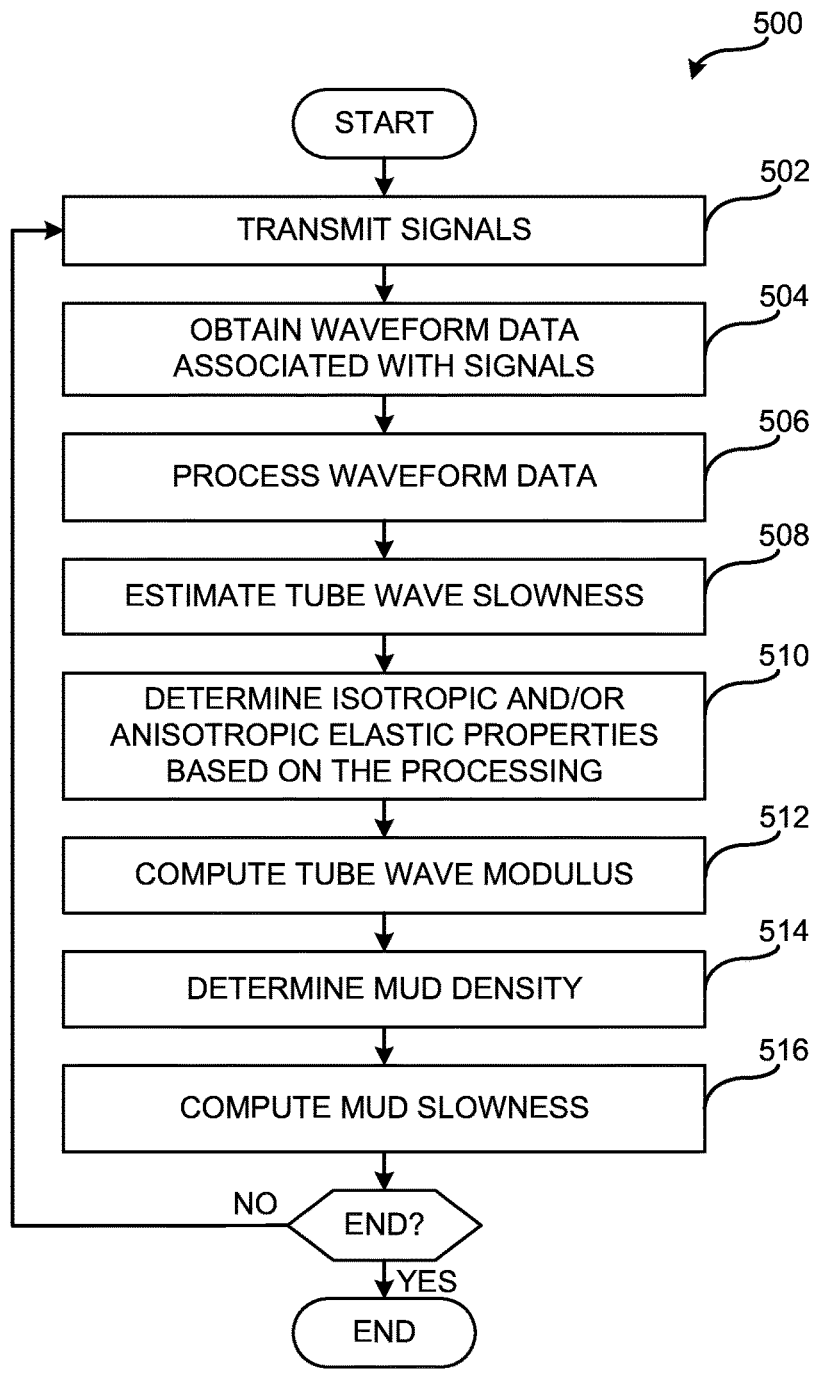
FIG. 5 depicts an example process that can be implemented using the example apparatus for estimating borehole mud slownesses.

FIG. 5 depicts an example flow diagram representative of processes that may be implemented using, for example, computer readable and executable instructions that may be used to determine mud slowness values. The example processes of FIG. 5 may be performed using a processor, a controller and/or any other suitable processing device. For example, the example processes of FIG. 5 may be implemented using coded instructions (e.g., computer readable instructions) stored on a tangible computer readable medium such as a flash memory, a read-only memory (ROM), and/or a random-access memory (RAM). As used herein, the term tangible computer readable medium is expressly defined to include any type of computer readable storage and to exclude propagating signals. Additionally or alternatively, the example processes of FIG. 5 may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example processes of FIG. 5 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, one or more of the example processes of FIG. 5 may be implemented manually or as any combination(s) of any of the foregoing techniques, for example, any combination of firmware, software, discrete logic and/or hardware. Further, although the example processes of FIG. 5 are described with reference to the flow diagram of FIG. 5, other methods of implementing the processes of FIG. 5 may be employed. For example, the order of execution of the blocks may be changed, and/or some of the blocks described may be changed, eliminated, sub-divided, or combined. Additionally, any or all of the example processes of FIG. 5 may be performed sequentially and/or in parallel by, for example, separate processing threads, processors, devices, discrete logic, circuits, etc.

The example method 500 of FIG. 5 may begin by transmitting a signal from one or more transmitters and/or sources (block 502) and receiving the signal at one or more receivers spaced from the transmitters. In some examples, the source(s) may be one or more monopole sources and/or multi-pole sources.

The received signals may be recorded and/or logged to generate waveform data associated with the signals (block 504). The waveform data may be processed to estimate a tube-wave slowness value and isotropic and/or anisotropic elastic properties (blocks 506-510). In some examples, determining the isotropic and/or anisotropic elastic properties includes estimating elastic constants, $C_{11}$, $C_{33}$, $C_{55}$, $C_{66}$ and $C_{13}$, an elastic stiffness tensor, an elastic compliance tensor and/or a reduced strain coefficient. The elastic constants may be determined based on one or more shear and/or compressional slowness values determined by processing the waveform data.

The example method 500 of FIG. 5 may then determine the tube-wave modulus (block 512). In some examples, the tube-wave modulus is determined based on a borehole cross-sectional area, a pressure pulse and/or a relative change of the borehole cross-sectional area based on the pressure pulse. In some examples, the relative change in the borehole cross-sectional is based on the radial displacement of the borehole. At block 514, the mud density is determined and, at block 516, the mud slowness is determined. The mud slowness may be determined based on the tube-wave slowness value, the drilling fluid density value and/or the tube-wave modulus value. The mud slowness values may be used to radially profile the borehole and/or to identify natural gas entry points in the borehole. Natural gas entry points may be identified because the mud slowness values substantially increase when such an entry point is present. Specifically, if the gas flows from the formation into the borehole, the gas substantially lowers the fluid bulk modulus, thereby increasing the mud slowness. Thus, the examples disclosed herein may be used as a qualitative and/or quantitative indicator of gas influx into the borehole.

Figure 6:
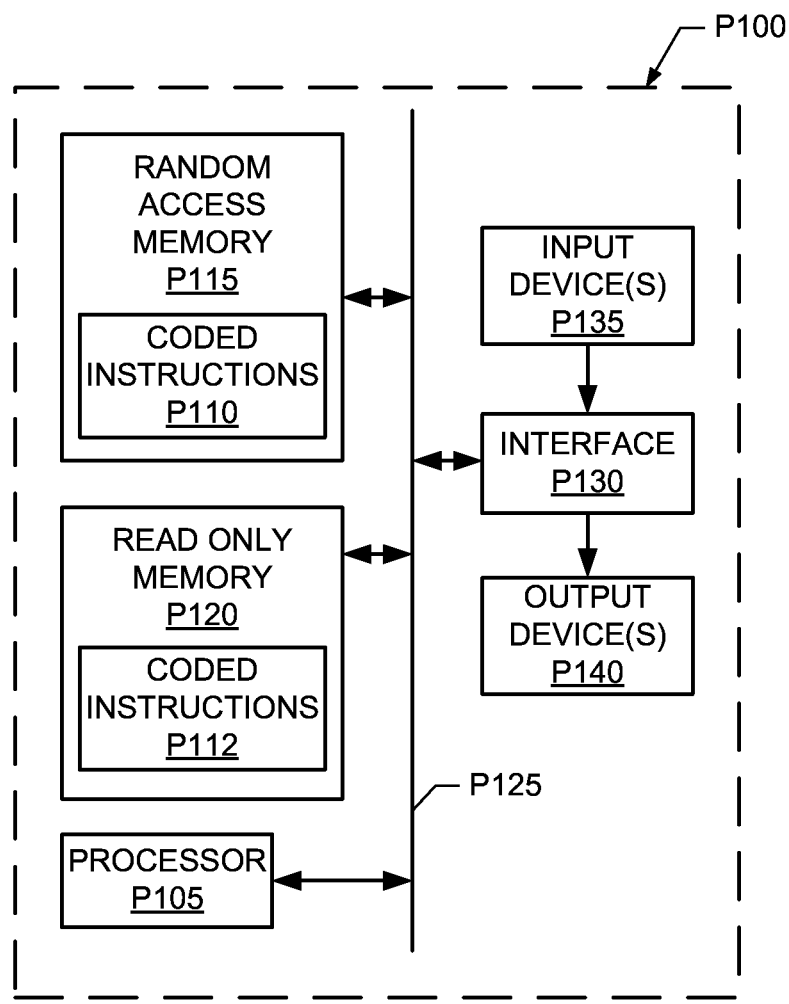
FIG. 6 is a schematic illustration of an example processor platform that may be used and/or programmed to implement any or all of the example methods are apparatus disclosed herein.

FIG. 6 is a schematic diagram of an example processor platform P100 that may be used and/or programmed to implement to implement a logging and control computer (FIG. 6), the processors 232 and/or 234 and/or any of the examples described herein. For example, the processor platform P100 can be implemented by one or more general purpose processors, processor cores, microcontrollers, etc.

The processor platform P100 of the example of FIG. 6 includes at least one general purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example methods and apparatus described herein.

The processor P105 is in communication with the main memory (including a ROM P120 and/or the RAM P115) via a bus P125. The RAM P115 may be implemented by dynamic random-access memory (DRAM), synchronous dynamic random-access memory (SDRAM), and/or any other type of RAM device, and ROM may be implemented by flash memory and/or any other desired type of memory device. Access to the memory P115 and the memory P120 may be controlled by a memory controller (not shown).

The processor platform P100 also includes an interface circuit P130. The interface circuit P130 may be implemented by any type of interface standard, such as an external memory interface, serial port, general purpose input/output, etc. One or more input devices P135 and one or more output devices P140 are connected to the interface circuit P130.

As set forth herein, an example method includes estimating a borehole drilling fluid slowness value based on a tube wave modulus value, a tube-wave slowness value, and a drilling fluid density value. The borehole associated with an anisotropic elastic medium. In some examples, the method the tube-wave slowness value is determined based on processing borehole sonic waveform data. In some examples, the tube-wave modulus value is determined based on one or more anisotropic elastic properties.

In some examples, the anisotropic elastic properties comprise one or more of elastic constants, an elastic stiffness tensor, an elastic compliance tensor, or a reduced strain coefficient. In some examples, the elastic constants are estimated based on one or more of a shear slowness values or compressional slowness value. In some examples, the tube-wave modulus value is based on a relative change in a borehole cross-sectional area caused by a pressure pulse. In some examples, the relative change in the borehole cross-sectional area caused by the pressure pulse is associated with radial displacement along a contour of the borehole. In some examples, the radial displacement along the contour of the borehole is computed using a theoretical model from the pressure pulse and elastic constants in the anisotropic elastic medium. In some examples, the method includes identifying a natural gas entry point into the borehole based on the estimate of the drilling fluid slowness value.

An example method includes processing borehole sonic waveform data to determine a drilling fluid slowness estimate. The drilling fluid slowness estimate is based on a tube-wave modulus value, a tube-wave slowness value, and a drilling fluid density value. The borehole is associated with an anisotropic elastic medium. The tube-wave modulus value is associated with radial displacement along a contour of a borehole.

In some examples, the tube-wave slowness is determined based on processing borehole sonic waveform data. In some examples, the tube-wave modulus is determined based on anisotropic elastic properties. In some examples, the anisotropic elastic properties include one or more of elastic constants, an elastic stiffness tensor, an elastic compliance tensor, or a reduced strain coefficient. In some examples, the elastic constants are estimated based on one or more of a shear slowness value or compressional slowness value. In some examples, the radial displacement along the contour of the borehole is computed using a theoretical model from a pressure pulse and elastic constants. In some examples, the method includes comprising identifying a natural gas entry point into the borehole based on the estimate of the drilling fluid slowness.

An example apparatus includes one or more sources spaced from a receiver. The one or more sources is to transmit one or more signals and the receiver to receive at least a portion of the one or more signals. The apparatus includes a processor to process borehole sonic waveform data to determine a drilling fluid slowness estimate. The drilling fluid slowness estimate is based on a tube-wave modulus value, a tube-wave slowness value, and a drilling fluid density value. In some examples, the tube-wave modulus value is associated with a radial displacement along a contour of a borehole. The radial displacement is determined based on a theoretical model from a pressure pulse and elastic constants. In some examples, the borehole is associated with an anisotropic elastic medium. In some examples, the processor is to identify a natural gas entry point into the borehole based on the estimate of the drilling fluid slowness.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

What is claimed is:

1. A method, comprising:
   providing a sonic tool in a borehole formed at least in part in an anisotropic subsurface formation wherein the sonic tool comprises at least one sonic signal transmitter;
   transmitting a sonic signal using the sonic tool;
   receiving the sonic signal through the anisotropic subsurface formation;
   generating borehole sonic waveform data associated with the sonic signal; and
   estimating a borehole drilling fluid slowness value based at least in part on the sonic waveform data wherein the estimating comprises adjusting a tube-wave slowness value term via a term that is based on a drilling fluid density value and a tube-wave modulus value that depends at least in part on radial displacements that vary along a contour of a borehole wall of the borehole due to stress response of the anisotropic subsurface formation to the sonic signal wherein the radial displacements are based at least in part on given anisotropic elastic properties, a pressure pulse and initial displacements.

2. The method of claim 1, wherein the anisotropic elastic properties comprise one or more of elastic constants, an elastic stiffness tensor, an elastic compliance tensor, or a reduced strain coefficient.

3. The method of claim 2, wherein the elastic constants are estimated based on one or more of a shear slowness values or compressional slowness value.

4. The method of claim 1, wherein the radial displacements correspond to a relative change in a borehole cross-sectional area caused by the pressure pulse.

5. The method of claim 1, wherein the radial displacements along the contour of the borehole are computed using a theoretical model from the pressure pulse and the anisotropic elastic properties.

6. The method of claim 1, further comprising identifying a natural gas entry point into the borehole based on the estimate of the drilling fluid slowness value.

7. A method, comprising:
   providing a sonic tool in a borehole formed at least in part in an anisotropic subsurface formation wherein the sonic tool comprises at least one sonic signal transmitter;
   transmitting a sonic signal using the sonic tool;
   receiving the sonic signal through the anisotropic subsurface formation;
   generating borehole sonic waveform data associated with the sonic signal; and
   processing the borehole sonic waveform data to determine a drilling fluid slowness estimate, wherein the drilling fluid slowness estimate is based on a tube-wave slowness value term adjusted via a term that is based on a drilling fluid density value and a tube-wave modulus value that depends at least in part on radial displacements that vary along a contour of a borehole wall of the borehole due to stress response of the anisotropic subsurface formation to the sonic signal wherein the radial displacements are based at least in part on given anisotropic elastic properties, a pressure pulse and initial displacements.

8. The method of claim 7, wherein the tube-wave slowness value term is determined based on processing borehole sonic waveform data.

9. The method of claim 7, wherein the anisotropic elastic properties comprise one or more of elastic constants, an elastic stiffness tensor, an elastic compliance tensor, or a reduced strain coefficient.

10. The method of claim 9, wherein the elastic constants are estimated based on one or more of a shear slowness value or compressional slowness value.

11. The method of claim 7, wherein the radial displacements along the contour of the borehole are computed using a theoretical model from the pressure pulse and the anisotropic elastic properties.

12. The method of claim 7, further comprising identifying a natural gas entry point into the borehole based on the drilling fluid slowness estimate.

13. An apparatus, comprising:
one or more sources spaced from a receiver, the one or more sources to transmit one or more signals and the receiver to receive at least a portion of the one or more signals; and
a processor to process borehole sonic waveform data to determine a drilling fluid slowness estimate, wherein the drilling fluid slowness estimate is based on a tube-wave slowness value term adjusted via a term that is based on a drilling fluid density value and a tube-wave modulus value that depends at least in part on radial displacements that vary along a contour of a borehole wall of the borehole due to stress response of an anisotropic subsurface formation a source signal wherein the radial displacements are based at least in part on given anisotropic elastic properties, a pressure pulse and initial displacements.

14. The apparatus of claim 13, wherein the radial displacements along the contour of the borehole are based on a theoretical model from the pressure pulse and anisotropic elastic properties.

15. The apparatus of claim 13, wherein the processor is to identify a natural gas entry point into the borehole based on the estimate of the drilling fluid slowness.

* * * * *